United States Patent

Miyashiro et al.

[11] 3,742,017
[45] June 26, 1973

[54] METHOD FOR THE PRODUCTION OF FORMYLNITRILE DERIVATIVES

[75] Inventors: Yutaka Miyashiro; Yasuo Ando, both of Nishinomiya, Japan

[73] Assignee: Takeda Chemical Industries, Ltd., Osaka, Japan

[22] Filed: Feb. 17, 1971

[21] Appl. No.: 116,269

[30] Foreign Application Priority Data
Feb. 24, 1970  Japan.............................. 45/15809

[52] U.S. Cl.............................. 260/465.6, 260/464
[51] Int. Cl............................................ C07c 121/02
[58] Field of Search........................ 260/465.6, 464

[56] References Cited
UNITED STATES PATENTS
3,211,778  10/1965  Kollonitsch...................... 260/465.6

OTHER PUBLICATIONS
Rodd; Chemistry of Carbon Compounds, Vol. I, Part A, 1951, page 544.

Primary Examiner—Joseph P. Brust
Attorney—Wenderoth, Lind & Ponack

[57] ABSTRACT

Formylnitrile derivatives of the formula

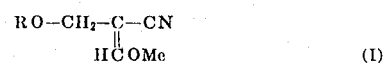

(I)

wherein R represents an alkyl group and Me represents an alkali metal atom, are prepared by reacting a compound of the formula $$RO-CH_2-CH_2-CN$$

(II)

with an alcohol and carbon monoxide in the presence of an alkali metal alcoholate. Compounds (I) are also formed by reacting acrylonitrile with an alcohol and carbon monoxide in the presence of an alkali metal alcoholate.

Compounds (I) are especially useful as intermediates in producing vitamin $B_1$.

7 Claims, No Drawings

METHOD FOR THE PRODUCTION OF FORMYLNITRILE DERIVATIVES

A METHOD FOR THE PRODUCTION OF FORMYLNITRILE DERIVATIVES

The present invention relates to a method for the production of formylnitrile derivatives, and more particularly to a novel and industrially feasible method for the production of formylnitrile derivatives represented by the following general formula (I), which are useful as intermediates for various chemical products, especially for vitamin $B_1$.

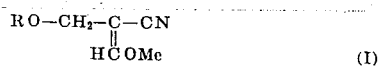
(I)

wherein R represents an alkyl group, and Me is an alkali metal atom.

Hitherto, the formylnitrile derivatives have been produced by formylation of the corresponding nitrile derivatives with a formic acid ester such as methyl formate and ethyl formate.

However, the formylation according to the known method requires a rather long period of time, and further the yield of the object compound is not very high. Moreover, the use of a formic acid ester as the formylating agent is accompanied with a serious drawback. The formic acid ester is a liquid of low boiling point (e.g., methyl formate boils at 31.5°C), and rather toxic to humans, and therefore its handling including storage, charging it to the reaction system and the separation of unreacted one from the reaction mixture, etc. necessarily requires carefully and severely controlled conditions and means and rather complicated apparatuses. Additionally, the formic acid ester is rather costly and the production of it also requires carefully and severely controlled conditions and complicated apparatus because of the same reason as mentioned above. Furthermore, since a corrosive material such as mineral acid (e.g. HCl, $H_2SO_4$, etc.) is used as catalyst for the production of a formic acid ester, the materials of the apparatus should be limited to those resistible to corrosion.

Taking the foregoing into consideration, it is well understood that the known method using a formic acid ester as the formylating agent can never be advantageously put into practical use on an industrial scale, although it can effectively be used for the production of the object compound on a mere experimental scale.

Under these circumstances, the present inventors have made extensive studies for improving the method for the production of compounds represented by the general formula (I) from the coresponding nitriles and unexpectedly found that an alcohol and carbon monoxide can act upon a β-alkoxy-propionitrile in the presence of an alkali metal alcoholate to produce an alkali metal salt of β-alkoxy-α-formylpropionitrile in only one step and in a good yield without using any other formylating agent. The present invention has been accomplished on the basis of this finding.

The principal object of the present invention is to provide a novel and industrially feasible method for the production of compounds represented by the general formula (I).

The method of the present invention, by which the above object can be attained, comprises allowing an alcohol and carbon monoxide to react with a compound represented by the general formula (II):

(II)

wherein R represents an alkyl group in the presence of an alkali metal alcoholate, whereby there is produced a compound of the above general formula (I) wherein R has the same meaning as above and Me is an alkali metal corresponding to the alkali metal alcoholate used.

According to the present method, the object compound can be obtained in high yield in a very short reaction time (e.g., in the best mode of the present method, the object compound is obtained in almost quantitative yield in 1 to 2 hours reaction). Furthermore, since no formylating agent other than carbon monoxide and an alcohol is used, the reaction can easily be conducted by simple procedures and by means of simple and conventional apparatus without taking any particular care of the reaction conditions, apparatus, materials of apparatus, etc. In addition, the reactants of the present method, i.e., carbon monoxide and an alcohol, are, needless to say, very cheaply and abundantly available on an industrial scale and therefore no serious problem is raised upon obtaining or preparing these reactants.

Thus, the present method is accompanied by no such drawbacks as encountered in the known method, and is remarkably feasible, effective and advantageous from an industrial point of view.

In the following, detailed explanation is made of the present method.

In the instant specification the group R is alkyl. It is to be noted, however, that R may be straight or branched chain alkyl. However, cycloalkyl or unsaturated alkyl may also be employed. Preferably the R group contains from one to six carbon atoms. Typical examples of the group are methyl, ethyl, propyl, isopropyl, butyl, isobutyl, sec.-butyl, tert.-butyl, pentyl and hexyl. Other groups may be cyclopropyl, cyclopentyl, cyclohexyl, dimethylallyl and allyl.

The alcohols used in the present invention may be any of saturated aliphatic monohydric ones, and use is preferably made of those having one to six carbon atoms. The typical examples of the alcohols include primary alcohols such as methyl alcohol, ethyl alcohol, propyl alcohol, isopropyl alcohol, n-butyl alcohol and n-amyl alcohol, n-hexyl alcohol, secondary alcohols such as sec.-butyl alcohol, and tertiary alcohols such as tert.-butyl alcohol, and tert.-pentyl alcohol.

The amount of the alcohol is usually about 1.0 to about 5.0 moles per mole of nitrile used as a starting compound.

The alkali metal alcoholate used in the present invention may be any of alcoholates produced from the above-mentioned alcohols and alkali metals such as, sodium, potassium and lithium. Among them, a potassium alcoholate such as potassium methylate, and potassium ethylate is practically most preferable. The alcohol composing the alkali metal alcoholate may be the same or different from the alcohol co-used in the reaction of the present invention. The amount of the alkali metal alcoholate is usually about 1.0 to about 5.0 moles per mole of nitrile used as a starting compound.

As carbon monoxide, a crude material may also be used in the present reaction as well as substantially pure material. The preferable amount of the carbon monoxide used is usually about 1.0 to about 10.0 moles per mole of nitrile used as starting compound.

In the present method, use of a solvent upon conducting the reaction generally gives a better result.

As the solvent, any of the organic ones inert to the alkali metal alcoholates may be used. Typical examples of the solvent are hydrocarbons or their derivatives such as ligroin, benzene, toluene, hexane, heptane and dimethoxyethane, ethers such as ethyl ether, isopropyl ether, tetrahydrofuran and dioxane, and the like. Among them, ethers, especially cyclic ethers such as tetrahydrofuran and dioxane are practically most desirable in respect to a yield of the object compound and the reaction time required.

The amount of the solvent to be used is not limited, but use of an insufficient amount of the solvent makes it difficult to handle the slurry of the object compound in the reaction vessel at the end of the reaction. Therefore, the most desirable amount is usually about 3 to about 8 times as much volume as the weight of the starting compound (II).

The reaction of the present invention is conducted practically by contacting a compound of the general formula (II) with an alcohol under carbon monoxide atmosphere in the presence of an alkali metal alcoholate and desirably in a solvent.

The reaction proceeds even at room temperature and atmospheric pressure, and may be accelerated by heating at about 80°C or lower and/or by elevating the pressure of the reaction system up to about 100 kg/cm² or lower.

Though the reaction time required varies with the amount of a starting compound, reaction temperature, pressure, solvent used, etc., it ranges generally from about 1 to about 20 hours.

In the present method, instead of the compound (II), acrylonitrile may be allowed to react with an alcohol under carbon monoxide atmosphere in the presence of an alkali metal alcoholate and preferably in the presence of a solvent.

In this case, it is assumed that the alcohol at first reacts with acrylonitrile to produce almost quantitatively a β-alkoxy-propionitrile corresponding to the alcohol, and then the alcohol and carbon monoxide further act upon the above-produced β-alkoxy-propionitrile to produce the object compound of the general formula (I) wherein R is an alkyl radical due to the alcohol co-used.

Therefore, also in this case after all, it can be said that the object compound (I) wherein R is an alkyl radical due to the alcohol co-used is produced by allowing carbon monoxide and an alcohol to act upon the compound (II) wherein R is an alkyl radical due to the alcohol co-used.

When the alkyl group R of the starting compound (II) used is different from the alkyl group due to the alkali metal alcoholate co-used, and/or from that due to the alcohol co-used, there are by-produced. of a compound of the formula (I) wherein R is an alkyl corresponding to the alkali metal alcoholate co-used and/or a compound of the formula (I) wherein R is an alkyl corresponding to the alcohol co-used, together with the main product of the formula (I) wherein R is the same alkyl as that in the starting compound (II).

In any case, when the object compound is used as an intermediate of vitamin B₁, the reaction product per se can be employed as starting compound of the next reaction step without isolation of the by-product(s) contained therein.

As mentioned before, the object compounds of the present invention are obtained as alkali metal salts represented by the general formula (I).

When the object compound of the general formula (I) is employed as an intermediate of vitamin B₁, the resulting reaction mixture per se of the present method can be used as a starting material of the next reaction step, i.e., the step of conversion of a

group (Me has the same meaning as above) to an acetal group,

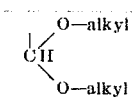

without any procedures for isolation or purification.

This step includes reacting the object compound of the general formula (I) with an alkylating agent (e.g., dimethyl sulfate, diethyl sulfate, etc.) in a suitable solvent (e.g., tetrahydrofuran, dioxane, isopropyl ether, etc.) and then reacting the resultant with an alcohol (e.g., methyl alcohol, ethyl alcohol, propyl alcohol, butylalcohol, etc.) in the presence of an alkali (e.g., sodium hydroxide, potassium hydroxide, etc.) and a solvent (e.g., benzene, toluene, etc.).

By these processes, α-dialkoxymethyl-β-alkoxy-propionitrile is almost quantitatively produced according to the following schema:

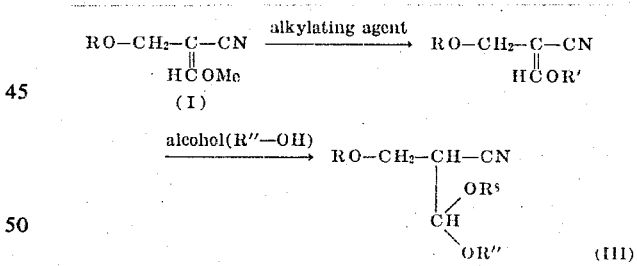

(wherein R has the same meaning as above, R' and R'' are same or different and each of R' and R'' stands for an alkyl group).

Thus the compound of the general formula (III) can be produced in a high yield by the present method and the subsequent processes from a compound of the general formula (II) via the compound of the general formula (I).

For further explanation of the present invention, the following Examples are given, wherein the word "part(s)" is based on weight unless otherwise noted and the relationship between "part" and "volume part" corresponds to that between gram and milliliter.

EXAMPLE 1

67 Volume parts of benzene, 6.6 volume parts (0.165 mole part) of methyl alcohol, 8.9 parts (0.165 mole part) of sodium methylate and 11.8 parts (0.138 mole part) of β-methoxypropionitrile are charged in an autoclave.

After replacement of air in the autoclave with carbon monoxide, carbon monoxide is further introduced into the autoclave until the inner pressure of the autoclave rises up to 36 kg/cm², and then the whole contents of the autoclave are stirred at room temperature (14°C) for 18 hours. During the above period, the pressure of carbon monoxide in the autoclave gradually decreases, and 0.276 mole part of carbon monoxide in total is consumed.

After substantially no pressure-drop in the autoclave is observed any longer, for the purpose of identification, a small amount of benzene is added to the reaction mixture, a small part of the whole mixture is taken out and subjected to distillation to remove the solvent, and thus white crystals obtained are analysed by infrared absorption spectrum and nuclear magnetic resonance spectrum.

Significant maximum absorptions in infrared absorption spectrum: 2,175 cm⁻¹ (due to conj. CN), 1,570 cm⁻¹ (due to conj. c=c)

Nuclear magnetic resonance spectrum (δ in D₂O)
3.30 (CH₃—, singlet )
4.05 (—O—CH₂—C, singlet)
7.98, 8.28(cis and trans,

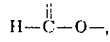

each singlet)

Thus, the crystal is identified as β-methoxy-α-sodioformylpropionitrile.

To the reaction mixture produced in the above-mentioned reaction step is added dropwise 23.9 parts (0.18 mole part) of dimethyl sulfate under cooling at 10°C, and then the whole mixture is heated at 40° to 50°C for 5 hours.

Then, to the resulting reaction mixture 6 volume parts (0.15 mole part) of methyl alcohol and 15 volume parts (0.18 mole part) of a 50 percent aqueous solution of sodium hydroxide are added dropwise under ice-cooling, followed by heating at 40°C for 4 hours.

After the completion of the reaction, the reaction mixture is subjected to concentration to dryness. To the residue water is added, and the whole mixture is extracted with benzene. The extract is subjected to distillation to leave yellow liquid. The residue is subjected to fractional distillation to give β-methoxy-α-dimethoxymethylpropionitrile as a liquid boiling at 97°C/3mmHg.

EXAMPLE 2

114 Volume parts of toluene, 12 volume parts (0.200 mole part) of ethyl alcohol, 13.6 parts (0.200 mole part) of sodium ethylate and 16.5 parts (0.166 mole part) of β-ethoxy-propionitrile are charged in an autoclave.

After replacement of the air in the autoclave with carbon monoxide, carbon monoxie is further introduced into the autoclave until the inner pressure of the autoclave rises up to 36 kg/cm², and then the whole contents in the autoclave are stirred at room temperature for 18 hours.

Dring the above period, the prsssure of carbon monoxide in the autoclave gradually decreases, and 0.33 mole part of carbon monoxide in total is consumed. After substantially no pressure-decrease in the autoclave is observed any longer, the reaction mixture is treated with the same manner as in Example 1, whereby the resultant is identified as β-ethoxy-α-sodioformylpropionitrile.

Significant maximum absorptions in infrared absorption spectrum: 2,150 cm⁻¹ (due to conj. CN), 1,570 cm⁻¹ (due to conj. c=c)

Nuclear magnetic resonance spectrum (δ in D₂O):
1.19 (CH₃—, triplet )
3.55 (—CH₂— quartette )
4.10 (—O—CH₂—C, singlet)
7.98, 8.18 (cis and trans,

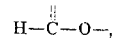

each singlet)

After a similar manner to the Example 1, β-ethoxy-α-diethoxymethylpropionitrile is produced from the reaction mixture produced in the above-mentioned reaction step.

EXAMPLE 3

67 volume parts of benzene, 12 volume parts (0.300 mole part) of methyl alcohol, 8.9 parts (0.165 mole part) of sodium methylate and 7.3 parts (0.138 mole part) of acrylonitrile are charged in an autoclave.

After replacement of the air in the autoclave with carbon monoxide, carbon monoxide is further introduced into the autoclave until the inner pressure of the autoclave rises up to 36 kg/cm², and then the whole contents in the autoclave are stirred at room temperature for 18 hours.

During the above period, 0.276 mole part of carbon monoxide in total is consumed. After substantially no pressure-decrease in the autoclave is observed any longer, the reaction mixture is treated with the same procedure as in Example 1, whereby the resultant is identified as β-methoxy-α-sodioformylpropionitrile.

After a similar manner to the Example 1, β-methoxy-α-dimethoxymethylpropionitrile is produced from the reaction mixture produced in the above-mentioned reaction step.

EXAMPLE 4

164.5 Parts of β-methoxypropionitrile, 110 parts of sodium methylate, 141.6 parts of methyl alcohol and 650 volume parts of tetrahydrofuran are charged in an autoclave.

After replacement of air in the autoclave with carbon monoxide, carbon monoxide is further introduced into the autoclave until the inner pressure of the autoclave rises up to 50 kg/cm², and then the whole mixture is stirred at 35°C for 2 hours.

During the above period, the pressure of carbon monoxide in the autoclave gradually decreases, and when the pressure decreases to 30 kg/cm², carbon monoxide is again introduced into the autoclave until the inner pressure of the autoclave rises up to 50 kg/cm².

After substantially no pressure-drop in the autoclave is observed any longer, for the purpose of identification, a small part of the reaction mixture is taken out and concentrated to dryness.

The white crystals obtained are analysed by nuclear magnetic resonance spectrum.

Nuclear magnetic resonance spectrum (δ in D₂O) : 7.98, 8.18 (cis and trans,

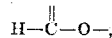

each singlet).

Thus, the crystals are identified as β-methoxy-α-sodioformylpropionitrile.

To the reaction mixture produced in the above-mentioned reaction step is added dropwise 156.5 parts of dimethyl sulfate, followed by stirring at 50°C for 4 hours.

After cooling, the reaction mixture is subjected to filtration to remove precipitated sodium methyl sulfate, and to the filtrate is added triethylamine to decompose the unreacted dimethyl sulfate. Then, the whole mixture is subjected to distillation to remove tetrahydrofuran, and to the residue is added water. The whole mixture is extracted with benzene, and the extract is subjected to distillation to leave an oily substance. The residue is subjected to distillation to give a liquid boiling at 100°C/2mmHg. The liquid is identified as a mixture of β-methoxy-α-methoxymethylenepropionitrile (84.6 percent) and α-dimethoxymethylacrylonitrile (14.5 percent) by a gas chromatography analysis.

EXAMPLE 5

76.0 Parts of β-methoxypropionitrile, 55 parts of sodium methylate, 69 parts of methyl alcohol and 300 volume parts of dioxane are charged in an autoclave, followed by conducting a similar procedure to the Example 4. The product obtained as identified as β-methoxy-α-sodioformylpropionitrile by nuclear magnetic resonance spectrum after a similar manner.

To the reaction mixture produced in the above-mentioned reaction step are added 112.8 parts of dimethyl sulfate and 500 volume parts of dioxane, followed by stirring at 47° to 55°C for 4 hours. And, after a similar manner to the Example 4, β-methoxy-α-methoxymethylenepropionitrile is produced as a liquid boiling at 95° to 100°C/2 mmHg.

EXAMPLE 6

99.3 Parts of β-ethoxypropionitrile, 68 parts of sodium ethylate, 119 parts of ethyl alcohol and 300 volume parts of tetrahydrofuran are charged in an autoclave. After the replacement of air in the autoclave with carbon monoxide, carbon monoxide is further introduced into the autoclave until the inner pressure of the autoclave rises up to 50 kg/cm², and then the whole mixture is stirred at 27° to 28°C for 2 hours. After a similar manner to Example 4, the product is identified as β-ethoxy-α-sodioformylpropionitrile by nuclear magnetic reasonance spectrum.

To the reaction mixture produced in the above mentioned reaction step is added dropwise 155 parts of dimethyl sulfate, followed by stirring at 46° to 50°C for 4 hours. And, after the similar manner to the Example 4, a liquid boiling at 80° to 118°C/3 mmHg. is collected. The liquid is identified as a mixture of unreacted β-ethoxypropionitrile (9.8 percent). α-diethoxymethylacrylonitrile (14.6 percent) and α-ethoxymethylenepropionitrile (76.7 percent) by a gas chromatography analysis.

EXAMPLE 7

63.5 Parts of β-butoxypropionitrile, 50 parts of sodium butylate, 95.4 parts of butyl alcohol and 350 volume parts of tetrahydrofuran are charged in an autoclave. After replacement of air in the autoclave with carbon monoxide, carbon monoxide is further introduced into the autoclave until the inner pressure of the autoclave raises up to 50 kg/cm², and then the whole mixture is stirred at 35°C for 3 hours. After a similar manner to the Example 4, the product is identified as β-butoxy-α-sodioformylpropionitrile by nuclear magnetic resonance spectrum.

Nuclear magnetic resonance spectrum (δ in D₂O): 7.92, 8.1 (cis and trans,

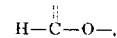

each singlet).

What is claimed is:

1. A method for the production of a compound of the formula:

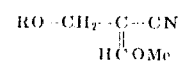

wherein R represents an alkyl having one to six carbon atoms and Me is an alkali metal atom, which comprises reacting carbon monoxide and an alkanol having one to six carbon atoms with a compound of the formula:

$$RO-CH_2-CH_2-CN$$

wherein R has the same meaning as above, in the presence of an alkali metal alcoholate derived from an alkanol having one to six carbon atoms and a solvent selected from the group consisting of tetra-hydrofuran, dioxane and dimethoxyethane.

2. A method according to claim 1, wherein the compound of the formula $$RO-CH_2-CH_2-CN$$ is contacted with an alkanol under carbon monoxide atmosphere in the presence of an alkali metal alcoholate, whereby the compound of the formula

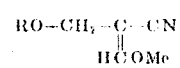

is produced.

3. A method as claimed in claim 1, wherein the solvent is tetrahydrofuran.

4. A method as claimed in claim 1, wherein the solvent is dioxane.

5. A method according to claim 1 wherein the solvent is dimethoxyethane.

6. A method according to claim 1 wherein the reaction is conducted at a temperature of between room temperature and 80°C, under a presusure elevated not more than 100 kg/cm² or 1 to 20 hours wherein the amount of the alkanol is between 1.0 and 5.0 mole parts, the alcoholate is present in amounts of between 1.0 and 5.0 mole parts and the carbon monoxide is present in an amount of between 1.0 and 10.0 mole parts.

7. A method for the production of a compound of the formula:

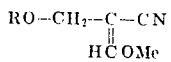

wherein R represents an alkyl having one to six carbon atoms and Me is an alkali metal atom, which comprises reacting carbon monoxide and an alkanol having one to six carbon atoms with acrylonitrile in the presence of an alkali metal alcoholate derived from an alkanol having one to six carbon atoms and a solvent selected from the group consisting of tetrahydrofuran, dioxane and dimethoxyethane.

* * * * *